United States Patent
Sharma et al.

(10) Patent No.: US 11,531,705 B2
(45) Date of Patent: Dec. 20, 2022

(54) SELF-EVOLVING KNOWLEDGE GRAPH

(71) Applicant: International Business Machines Corporation, Armonk, NY (US)

(72) Inventors: Bhuvan Sharma, Belmont, MA (US); Kirk Alan Beaty, Goldens Bridge, NY (US); Vanessa Michelini, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 16/193,106

(22) Filed: Nov. 16, 2018

(65) Prior Publication Data
US 2020/0159867 A1    May 21, 2020

(51) Int. Cl.
*G06F 16/35* (2019.01)
*G06F 16/33* (2019.01)
*G06F 16/901* (2019.01)
*G06N 5/02* (2006.01)

(52) U.S. Cl.
CPC ...... *G06F 16/9024* (2019.01); *G06F 16/3347* (2019.01); *G06F 16/353* (2019.01); *G06N 5/022* (2013.01)

(58) Field of Classification Search
CPC .......................... G06F 16/313; G06F 16/3347
See application file for complete search history.

(56) References Cited

U.S. PATENT DOCUMENTS

| | | | | |
|---|---|---|---|---|
| 5,864,855 A | * | 1/1999 | Ruocco | G06F 16/355 |
| 6,611,825 B1 | * | 8/2003 | Billheimer | G06F 16/313 |
| | | | | 706/45 |
| 6,769,022 B1 | | 7/2004 | Dekoning et al. | |
| 7,103,731 B2 | | 9/2006 | Gibble et al. | |
| 7,752,437 B1 | | 7/2010 | Thakur et al. | |
| 8,073,880 B2 | | 12/2011 | LaMonica | |
| 9,329,597 B2 | | 5/2016 | Stoschek et al. | |
| 9,544,361 B2 | | 1/2017 | Boddhu et al. | |

(Continued)

OTHER PUBLICATIONS

Sathish et al. "Evolving the User Graph: From unsupervised topic models to knowledge assisted networks." Semantic Computing (ICSC), 2015 IEEE International Conference on. IEEE, 2015.

(Continued)

*Primary Examiner* — Marc S Somers
(74) *Attorney, Agent, or Firm* — Edell, Shapiro & Finnan, LLC

(57) ABSTRACT

A computer system updates a knowledge graph. A model corresponding to a set of documents is received, wherein the model comprises a plurality of entities, a plurality of entity associations, and a plurality of confidence scores corresponding to the plurality of entity associations. A relevance value is calculated for each entity of the plurality of entities that are present in the set of documents and for each entity of the plurality of entities that are present in a new document. One or more entity associations that are supported by specific portions of the new document are identified. The confidence scores for each of the identified one or more entity associations are updated based on a level of support in the new document. Embodiments of the present invention further include a method and program product for updating a knowledge graph in substantially the same manner described above.

15 Claims, 4 Drawing Sheets

(56) References Cited

U.S. PATENT DOCUMENTS

| | | | | |
|---|---|---|---|---|
| 9,679,018 | B1* | 6/2017 | Yuksel | G06F 16/335 |
| 9,720,944 | B2 | 8/2017 | Lightner et al. | |
| 9,916,107 | B2 | 3/2018 | Bolik et al. | |
| 2002/0194369 | A1 | 12/2002 | Rawlins et al. | |
| 2003/0037187 | A1 | 2/2003 | Hinton et al. | |
| 2003/0208485 | A1* | 11/2003 | Castellanos | G06F 16/3326 707/999.005 |
| 2005/0080781 | A1* | 4/2005 | Ryan | G06F 16/954 707/999.005 |
| 2008/0270119 | A1* | 10/2008 | Suzuki | G06F 40/56 704/9 |
| 2010/0153318 | A1* | 6/2010 | Branavan | G06F 40/169 706/46 |
| 2012/0016877 | A1* | 1/2012 | Vadrevu | G06F 16/35 707/737 |
| 2017/0116519 | A1* | 4/2017 | Johnson | G06N 20/00 |
| 2018/0150459 | A1* | 5/2018 | Farid | G06F 16/24578 |

OTHER PUBLICATIONS

Nam et al. "SRDF: extracting lexical knowledge graph for preserving sentence meaning." Proceedings of the Open Knowledge Base and Question Answering Workshop (OKBQA 2016). 2016.

Choi et al. "Filling a Knowledge Graph with a Crowd." Proceedings of the Open Knowledge Base and Question Answering Workshop (OKBQA 2016). 2016.

Lee et al., "Formation of Information Need as a Questioning: A Conceptual Representation for Semantic Web based QA System." Biomedical Knowledge Engineering Laboratory, Seoul National University, Seoul, Korea.

Ding et al., "Data-driven discovery: A new era of exploiting the literature and data." Journal of Data and Information Science 1.4 (2016): pp. 1-9.

Chen et al., "IBM Research Report Holistic Information Management Solutions", IBM Research Division, Jul. 2005, 12 pages.

Lovelace et a., "IBM Enterprise Content Management and System Storage Solutions: Working Together", International Technical Support Organization, IBM Corp, Sep. 2008, 244 pages.

* cited by examiner

|  | D1 | D2 | D3 | D4 | D5 |
|---|---|---|---|---|---|
| LAUGH | 0.2 | 0.5 |  | 0.3 |  |
| LOVE | 0.3 | 0.12 |  | 0.2 |  |
| FUN |  |  |  |  |  |
| TASTE |  |  | 0.32 |  | 0.44 |
| WEIRD | 0.23 |  |  | 0.14 |  |
| COMPLEX |  |  | 0.32 |  |  |
| DISAPPOINT |  |  | 0.21 |  |  |
| HAPPY | 0.1 |  |  |  |  |
| NEVER |  |  | 0.12 | 0.31 |  |

FIG.3

SELF-EVOLVING KNOWLEDGE GRAPH

BACKGROUND

1. Technical Field

Present invention embodiments relate to knowledge graphs, and more specifically, to self-evolving knowledge graphs.

2. Discussion of the Related Art

A knowledge graph represents a collection of interlinked descriptions of entities, which can include any real-world object, event, situation or abstract concept. Knowledge graphs may be constructed by identifying the associations between different entities. For example, a knowledge graph in the genomics domain may include entities such as genes, gene variants, drugs, and diseases, and may indicate relations between the entities, such as the associations of certain gene variants with particular diseases. Conventional approaches to the construction of knowledge graphs require researchers, who are subject matter experts, to study new publications in order to discover relationships between entities. While knowledge graphs can provide researchers with insights into the interrelations of entities, the manual assembly and updating of knowledge graphs can be quite complex and time-consuming.

SUMMARY

According to one embodiment of the present invention, a computer system updates a knowledge graph. A model corresponding to a set of documents is received, wherein the model comprises a plurality of entities, a plurality of entity associations, and a plurality of confidence scores corresponding to the plurality of entity associations. A relevance value is calculated for each entity of the plurality of entities that are present in the set of documents and for each entity of the plurality of entities that are present in a new document. One or more entity associations that are supported by specific portions of the new document are identified. The confidence scores for each of the identified one or more entity associations are updated based on a level of support in the new document. Thus, present invention embodiments enable a self-evolving knowledge graph to be updated automatically to encompass information found in new documents in the knowledge graph's domain of study, thereby eliminating the need for researchers to manually discover and add entity associations to the knowledge graph.

Various other embodiments of the present invention will now be discussed. In some embodiments, the relevance value for each entity is calculated according to a term frequency-inverse document frequency. By using a term frequency-inverse document frequency, the importance of entities that appear especially in a given document but not as much in a background corpus may be emphasized. In some embodiments, identifying the one or more entity associations that are supported by the new document comprises calculating a cosine similarity value between the relevance values of the new document and the relevance values of the set of documents, and determining that the cosine similarity value exceeds a threshold value. By ensuring that a cosine similarity value exceeds a threshold value, an administrator can ensure that a self-evolving knowledge graph adds only those entity associations that are deemed to be above a predetermined strength of association. In some embodiments, the plurality of entities are present in one or more of a title of a document, and an abstract of a document. By analyzing the titles and abstracts of documents for entities, computing requirements may be reduced by avoiding processing an entire text of a document. In some embodiments, the set of documents and the new document are processed by applying text normalization using one or more of syntactic cues and semantic cues. Text normalization may more accurately represent entities by merging any entities whose differences are negligible, and may also reduce computing requirements by removing entity entries that are near-identical. In some embodiments, the new document is selected from a second set of documents, and fetching the second set of documents from one or more repositories is performed according to a predefined schedule. By scheduling the fetching of documents, knowledge graphs can be updated according to a schedule that matches the publication schedules of publication sources, thereby ensuring that the knowledge graph is always up-to-date, and reducing processing requirements by updating the knowledge graph only when there are new documents to ingest. Embodiments of the present invention further include a method and program product for updating a knowledge graph in substantially the same manner described above.

BRIEF DESCRIPTION OF THE DRAWINGS

Generally, like reference numerals in the various figures are utilized to designate like components.

FIG. 3 is a chart depicting a vector space model in accordance with an embodiment of the present invention.

DETAILED DESCRIPTION

Figure 1:
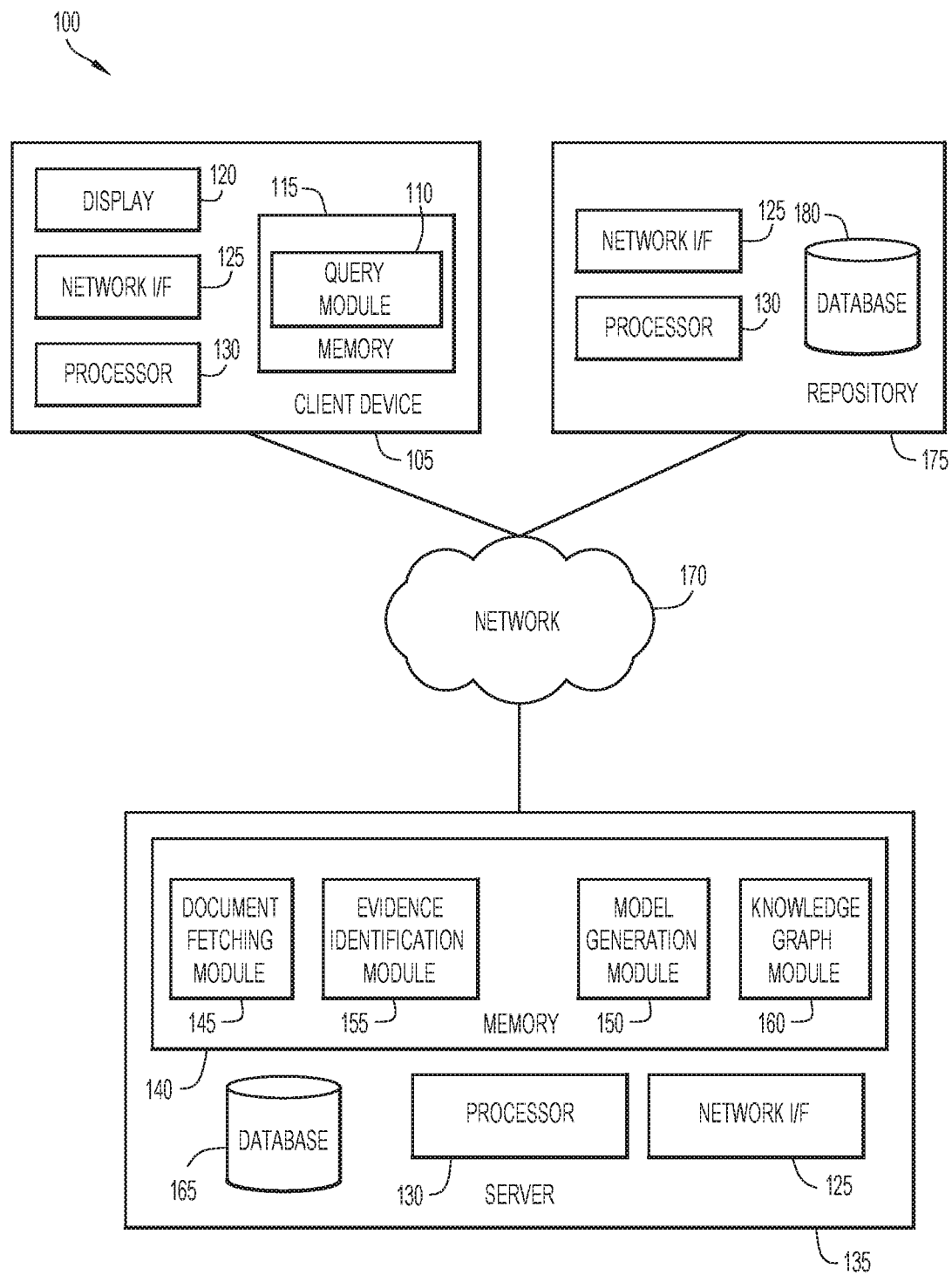
FIG. 1 is a block diagram depicting a computing environment for updating a knowledge graph in accordance with an embodiment of the present invention.

Present invention embodiments relate generally to knowledge graphs, and more specifically, to self-evolving knowledge graphs. Conventional first-generation knowledge graphs may be constructed using a corpus of documents that are captured at a single point in time. Knowledge graphs show associations between two or more concepts, which are referred to as entities. For example, a knowledge graph may show an entity association between one entity, such as a particular gene variant, and another entity, such as a disease. Such a knowledge graph may enable a researcher to explore the connection between the gene variant and the disease, potentially resulting in a discovery that the gene variant causes, or is a risk factor contributing toward, the disease.

As new documents are published, there is a need to continually update a knowledge graph. Present invention embodiments provide a self-evolving knowledge graph that updates to encompass newly-published information. New documents are compared to existing documents using a vector space model, and any documents that support associations between entities can be used to update the knowledge graph. Thus, present invention embodiments enable a self-evolving knowledge graph to be updated automatically to encompass information found in new documents in the knowledge graph's domain of study, thereby eliminating the need for researchers to manually discover and add entity associations to the knowledge graph.

In some embodiments, the relevance value for each entity is calculated according to a term frequency-inverse document frequency. By using a term frequency-inverse document frequency, the importance of entities that appear especially in a given document but not as much in a background corpus may be emphasized. In some embodiments, identifying the one or more entity associations that are supported by the new document comprises calculating a cosine similarity value between the relevance values of the new document and the relevance values of the set of documents, and determining that the cosine similarity value exceeds a threshold value. By ensuring that a cosine similarity value exceeds a threshold value, an administrator can ensure that a self-evolving knowledge graph adds only those entity associations that are deemed to be above a predetermined strength of association. In some embodiments, the plurality of entities are present in one or more of a title of a document, and an abstract of a document. By analyzing the titles and abstracts of documents for entities, computing requirements may be reduced by avoiding processing an entire text of a document. In some embodiments, the set of documents and the new document are processed by applying text normalization using one or more of syntactic cues and semantic cues. Text normalization may more accurately represent entities by merging any entities whose differences are negligible, and may also reduce computing requirements by removing entity entries that are near-identical. In some embodiments, the new document is selected from a second set of documents, and fetching the second set of documents from one or more repositories is performed according to a predefined schedule. By scheduling the fetching of documents, knowledge graphs can be updated according to a schedule that matches the publication schedules of publication sources, thereby ensuring that the knowledge graph is always up-to-date, and reducing processing requirements by updating the knowledge graph only when there are new documents to ingest. Thus, self-evolving knowledge graphs can ensure that researchers are provided with up-to-date information relating to the relationships between entities in any domain of study, while eliminating the need to perform time-consuming manual discovery of entity associations.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for updating a knowledge graph in accordance with an embodiment of the present invention. As depicted, computing environment 100 includes a client device 105, a server 135, a network 170, and a repository 175. It is to be understood that the functional division among components of computing environment 100 have been chosen for purposes of explaining the present invention embodiments and is not to be construed as a limiting example.

Client device 105 includes memory 110 with query module 115, a display 120, a network interface 125, and at least one processor 130. In various embodiments of the present invention, client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Client device 105 may include internal and external hardware components, as depicted and described in further detail with respect to FIG. 4.

Query module 115 may include one or more modules or units to perform various functions of present invention embodiments described below. Query module 115 may be implemented by any combination of any quantity of software and/or hardware modules or units, and may reside within memory 110 of client device 105 for execution by a processor, such as processor 130.

Query module 115 may enable a user of client device 105 to interact with one or more knowledge graphs. Query module 115 may execute queries against a knowledge graph in order to identify associations between entities. For example, a user may provide a query comprising one or more entities, and query module 115 may send the query to server 135, which processes the query and sends the results back to query module 115 for presentation to the user. Results of processing a query may include any entities associated with the queried entity, as well as the strengths of each entity association. Thus, an entity association may exist between two or more entities. In some embodiments, query module 115 enables a user to visually explore a knowledge graph, which may be presented on display 120 of client device 105 as a map of entities and entity associations. For example, entities may be displayed as nodes, and entity associations may be displayed as lines between nodes. Display 120 may include any output device for presenting information in a visual form, such as a liquid crystal display (LCD), a cathode ray tube (CRT) display, or a light-emitting diode (LED) display.

Server 135 includes a network interface 125, at least one processor 130, memory 140, and a database 165. In general, server 135 and its modules maintain one or more self-evolving knowledge graphs by processing new documents to determine whether the documents support or contradict associations between entities. When new documents are processed, the knowledge graph is updated accordingly. Server 135 may share data with client device 105, including any data relating to a knowledge graph and any results of processed queries. Server 135 may include internal and external hardware components, as depicted and described in further detail with respect to FIG. 4.

Memory 140 includes document fetching module 145, model generation module 150, evidence identification module 155, and knowledge graph module 160. Document fetching module 145, model generation module 150, evidence identification module 155, and knowledge graph module 160 may include one or more modules or units to perform various functions of present invention embodiments described below. Document fetching module 145, model generation module 150, evidence identification module 155, and knowledge graph module 160 may be implemented by any combination of any quantity of software and/or hardware modules or units, and may reside within memory 140 of server 135 for execution by a processor, such as processor 130.

Document fetching module 145 may retrieve one or more documents for processing by server 135. In particular, document fetching module 145 may locate documents that correspond to a field of study that is the subject of a knowledge graph. For example, if there is a knowledge graph that relates to medicine, then document fetching module 145 may locate any medical publications, and fetch the publications (or portions thereof) for processing by server 135 and its modules. In some embodiments, document fetching module 145 retrieves a title and/or an abstract of each document. Document fetching module 145 may retrieve data from a remote data repository, such as repository 175. In some embodiments, document fetching module 145 may search one or more repositories for new documents (i.e., documents that have not already been processed into a knowledge graph) on a predefined schedule. For example, document fetching module 145 may scan one or more repositories on a daily basis, an hourly basis, or on a basis that corresponds to a predicted update schedule of the repository. Document fetching module 145 may monitor a repository for updates and retrieve any new documents in response to the repository being updated.

Model generation module 150 may process data retrieved by document fetching module 145 in order to construct or augment one or more vector space models. A vector model may be a two-dimensional matrix, with one dimension comprising entities, and the other dimension comprising documents. Each entity may be a single word or a phrase, and the number of unique entities in a corpus of documents determines the dimensions of the vector space model. Model generation module 150 may generate a vector space model according to the lexical properties of text, which may be further enriched by using syntactic and semantic cues. Syntactic cues refer to properties of text that include word order, rules and patterns of language (e.g., grammar), and punctuation. Semantic cues may utilize an ontology or dictionary of various entities of interest in order to normalize text.

Model generation module 150 may perform one or more pre-processing operations in order to isolate entities in a document. Each sample of text may be normalized by stemming, which reduces inflected words to their base form. Text may by normalized to reduce alternative spellings of words to a single form (e.g., "colour" may be changed to "color"). Text may also be normalized to convert synonymous terms to a single form; for example, since "ASA" and "acetylsalicylic acid" are alternative names for aspirin, they may be replaced with "aspirin." Model generation module 150 may also remove high-frequency and low-frequency words, and may remove stop words, such as "a," "the," "who," "is," and the like.

The vector space model may include a relevance value for a given entity in each document. The relevance values may reflect the number of times that an entity appears in a document or set of documents, and may be calculated according to a binary weight statistic, a term frequency statistic, or a term frequency-inverse document frequency (tf-idf) statistic. In particular, a tf-idf statistic represents the importance of an entity in a document as compared to the entity's importance in a larger overall set of documents. The vector space model will be described in further detail below with reference to FIG. 3.

Evidence identification module 155 may identify documents, referred to as evidences, that support a particular entity association between two or more entities. In particular, evidence identification module 155 analyzes a vector space model by comparing the vectors of new documents to the vectors of pre-existing documents that support a particular entity association. Each document's vector may include the relevance values for the entities in that document. Evidence identification module 155 may compare a vector of a new document to a vector of a document that is used as evidence for a particular entity association. If the new document exceeds a predefined similarity threshold when compared to the pre-existing document, the new document is considered to be evidence for the entity association, and may be added to the group of other documents that serve as evidence. In some embodiments, evidence identification module 155 compares the vectors of documents by calculating a cosine similarity between the two vectors.

Knowledge graph module 160 may create and update knowledge graphs that are based on entity associations determined by processing the existing and new documents. Knowledge graph module 160 may enable a user of client device 105 to explore one or more knowledge graphs. Knowledge graph module 160 may also process a query comprising one or more entities in order to present a user with the portions of a knowledge graph that are relevant to the queried entities. For example, since knowledge graphs can be unmanageably large and complex, knowledge graph module 160 may process a query by zooming in to a relevant portion of a knowledge graph. In addition or alternatively, knowledge graph module 160 may process a query by filtering out any irrelevant portions of a knowledge graph, leaving only entities that the user has queried, along with any associated entities, other entities that are associated with the associated entities but not associated with the queried entity (e.g., entities that are N degrees of separation from the queried entities), and the like.

Knowledge graph module 160 may generate an initial knowledge graph or may be provided with a manually-defined initial knowledge graph. A knowledge graph may be created by domain experts who use their domain expertise to assemble a knowledge graph based on their understanding of the knowledge graph's subject area. In some embodiments, knowledge graph module 160 may assemble an initial knowledge graph using conventional or other machine learning techniques, including unsupervised learning. For example, knowledge graph module 160 may analyze an initial corpus of documents to identify entities and entity associations.

Database 165 may include any non-volatile storage media known in the art. For example, database 165 can be implemented with a tape library, optical library, one or more independent hard disk drives, or multiple hard disk drives in a redundant array of independent disks (RAID). Similarly, data on database 165 may conform to any suitable storage architecture known in the art, such as a file, a relational database, an object-oriented database, and/or one or more tables. Database 165 may include any data relating to knowledge graphs, including data fetched by document fetching module 145 and data relating to vector space models.

Network 170 may include a local area network (LAN), a wide area network (WAN) such as the Internet, or a combination of the two, and includes wired, wireless, or fiber optic connections. In general, network 170 can be any combination of connections and protocols that will support communications between client device 105, server 135, and repository 175 via their respective network interfaces 125 in accordance with embodiments of the present invention.

Repository 175 includes a network interface 125, at least one processor 130, and a database 180. In general, repository 175 hosts documents that can potentially serve as evidence to support entity associations. For example, database 180 of repository 175 may include scientific or scholarly publications, which may be organized by topic or field of study. Document fetching module 145 of server 135 may query repository 175 in order to find new documents relating to a particular topic or field of a knowledge graph. In some embodiments, repository 175 is a bibliographic database, such as MEDLINE®.

Database 180 may include any non-volatile storage media known in the art. For example, database 185 can be implemented with a tape library, optical library, one or more independent hard disk drives, or multiple hard disk drives in a redundant array of independent disks (RAID). Similarly, data on database 180 may conform to any suitable storage architecture known in the art, such as a file, a relational database, an object-oriented database, and/or one or more tables. Database 180 may include any documents, such as scholarly publications, that can serve as evidence for entity associations in a knowledge graph.

Figure 2:
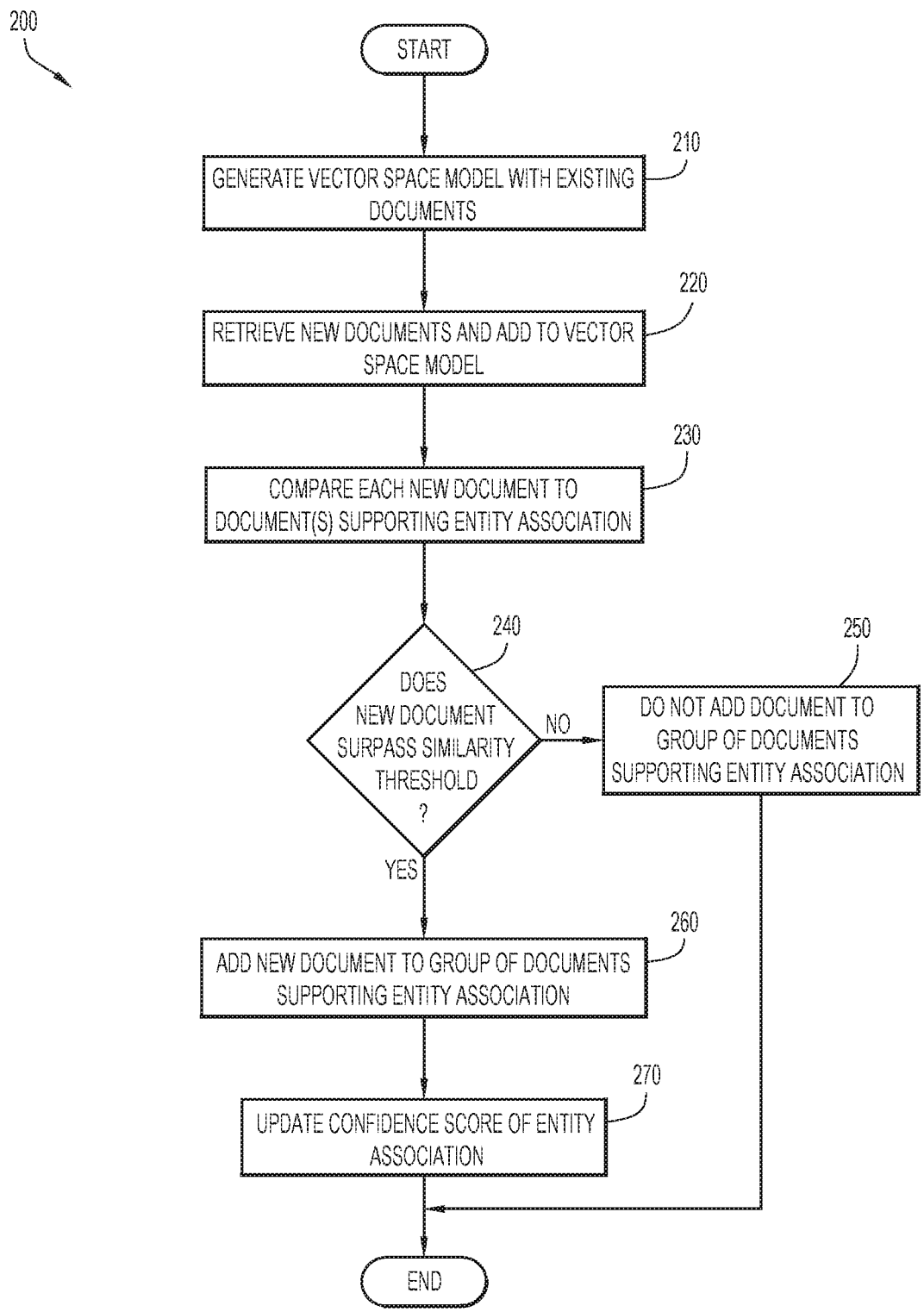
FIG. 2 is a flow chart depicting a method of updating a knowledge graph in accordance with an embodiment of the present invention.

FIG. 2 is a flow chart depicting a method 200 of updating a knowledge graph in accordance with an embodiment of the present invention.

A vector space model is generated using existing documents at operation 210. The vector space model may be generated by model generation module 150, and may include a vector that corresponds to each document and includes entities that appear in the document as well as the relevance value of the entity. Model generation module 150 may process documents by performing text normalization operations, including stemming operations, replacement of synonymous terms, removal of high-frequency and/or low-frequency terms, and removal of stop words. Once model generation module 150 processes the documents, entities may be extracted, and relevance values may be computed for each entity. Relevance values may be computed as term frequency-inverse term frequency (tf-idf) statistics, which correlate to how well an entity is represented in a document as compared to the rest of a set of documents.

New documents are retrieved and added to the vector space model at operation 220. Document fetching module 145 may retrieve text, including the titles and abstracts of documents, which are processed by model generation module 150 similarly to how the existing documents are processed at operation 210. For example, the text of new documents may be normalized, and tf-itf values may be computed for each entity.

Each new document is compared to one or more existing documents supporting each entity association at operation 230. Evidence identification module 155 may compare the vector of the new document to the vector of an existing document by performing a cosine similarity comparison of the vectors' relevance values to compute a similarity value. In various embodiments, evidence identification module 155 may use other relevance measures, including the Euclidean distance between vectors, a Jaccard index, or a Pearson correlation. In order to determine whether a new document should be used as evidence to support an entity association, the new document is compared to any other documents being used as evidence for the entity association. Evidence identification module 155 may thus compare vectors in order identify entity associations between two or more entities.

Operation 240 determines whether a new document surpasses a similarity threshold when compared to the one or more existing document. The similarity threshold may be a predetermined value that can vary depending on the subject field of study of the knowledge graph. In some embodiments, the threshold is an experimentally-derived empirical value. In the case of an entity association in which a single document serves as evidence, the vectors of the two documents are simply compared using cosine similarity, and the value is compared to a predetermined similarity threshold value. If the value exceeds the threshold, the new document is added to the group of existing documents that support the entity threshold at operation 250. When an entity association is supported by multiple documents, the new document may be compared to each document using cosine similarity, and a mode of the results may be used to determine whether the new document should be added to the evidence group. For example, if a new document is compared to three documents, and the cosine similarity passes a similarity threshold for two out of the three documents, then operation 240 may determine that the new document should be added to the group of existing documents at operation 250. In some embodiments, when an entity association is supported by multiple documents, the tf-idf values for each of the existing documents' vectors are averaged, and the new document's tf-idf values are compared to the average values using cosine similarity. If the similarity between a new document and one or more existing documents does not surpass the similarity threshold, the new document is not added to the group of documents supporting the entity association at operation 260.

The confidence score of an entity association is updated at operation 270. Confidence scores may reflect the ranking of an entity association as compared to other entity associations in a set of documents, and as such, is a relative value and not an absolute value. For example, if there are three entity associations in a knowledge graph, with the first entity association being supported by three documents, the second by five documents, and the third by two documents, then the confidence score for the first entity association may be calculated as 3/(3+5+2), or 0.3, which is the proportion of the number of documents of the first entity association compared to the overall amount of documents. Thus, the confidence scores for the second and third entity associations would be 0.5 and 0.2, respectively. When a new document is added to a group of documents used as evidence, the confidence scores are recalculated. For example, if another document is found to support the first entity association, the new confidence score for the first entity association becomes 4/(4+5+2), or 0.36. Furthermore, the confidence scores of the second and third entity associations are reduced to 0.45 and 0.18, respectively.

FIG. 3 is a chart depicting a vector space model 300 in accordance with an embodiment of the present invention. As depicted, vector space model 300 includes a list of entities 310, vectors for existing documents 320, and vectors for new documents 330. Each numerical value may represent a tf-idf value for an entity in the given document; for example, the value 0.23 in document vector D1 represents the tf-idf value for the entity "weird" in document D1.

Vectors for new documents 330 (i.e., documents D4 and D5) may be compared to the vectors of existing documents by computing the cosine similarity. For example, similarity of documents D4 and D5 may be compared with each of documents D1, D2 and D3, and the resulting effect may be that D4 is highly similar to D1 due to many common entities such as "laugh", "love" and "weird". Since those entities, and others from D1, D2, D3 do not appear in document D5, the similarity of document D5 will be below the threshold, and therefore D5 will not be used to support an entity association between entities "laugh", "love" and "weird". Between these entities, the confidence on association between "laugh" and "love" may be incremented more than between "laugh"-"weird" or "love"-"weird" since "laugh"-"love" is also supported by another document D2. Document D4 may therefore be used as evidence to increment confidence on the entity association between "laugh" and "love."

Figure 4:
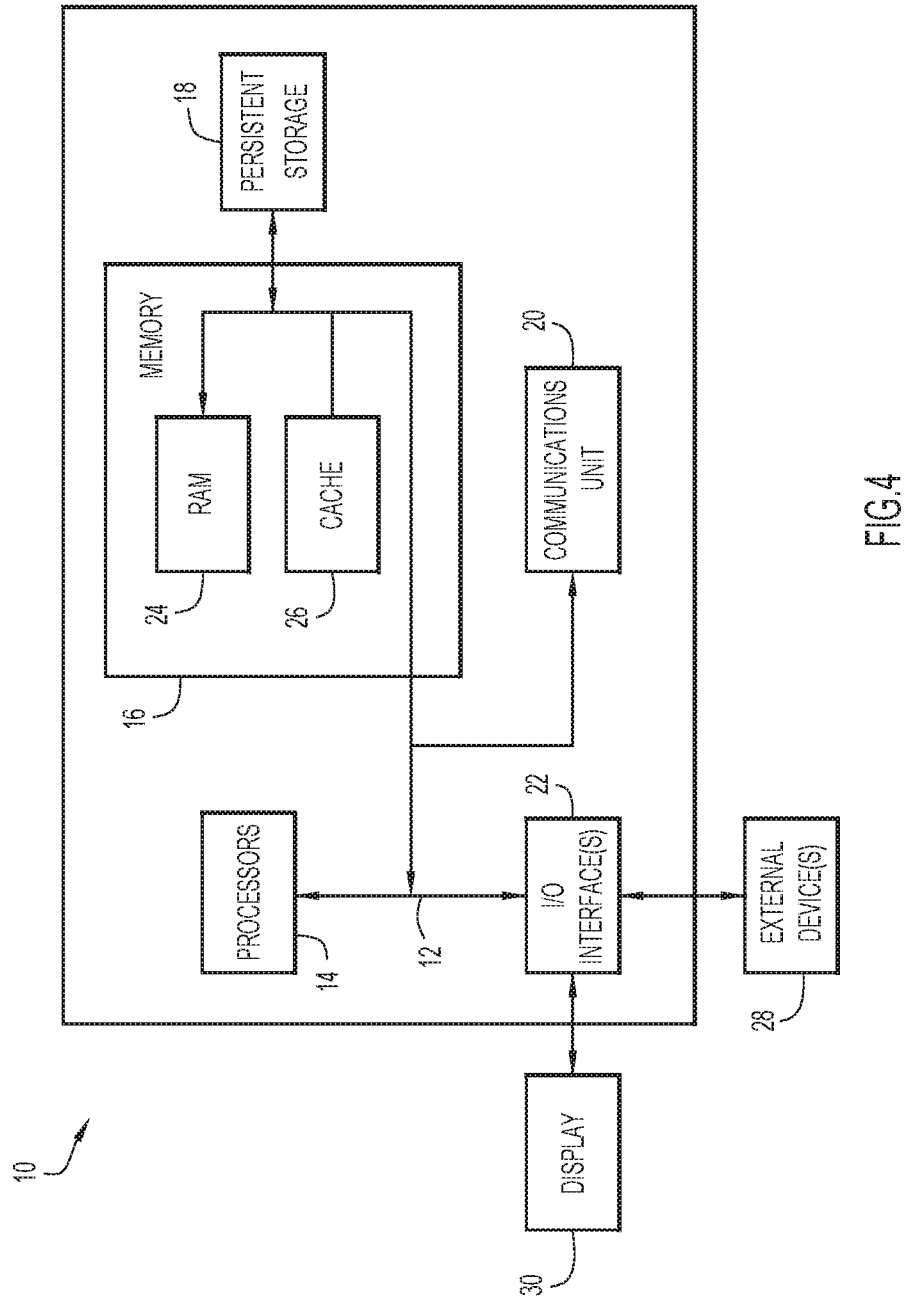
FIG. 4 is a block diagram depicting a computing device in accordance with an embodiment of the present invention.

FIG. 4 is a block diagram depicting components of a computer 10 suitable for executing the methods disclosed herein. Computer 10 may implement client device 105, server 135, and repository 175 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to a self-evolving knowledge graph (e.g., document text data, vector space model data, entity data, entity association data, confidence score data, etc.) may be stored within any conventional or other data structures (e.g., files, arrays, lists, stacks, queues, records, etc.) and may be stored in any desired storage unit (e.g., database, data or other repositories, queue, etc.) The data transmitted between client device 105, server 135, and repository 175 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to a self-evolving knowledge graph (e.g., document text data, vector space model data, entity data, entity association data, confidence score data, etc.) may include any information provided to, or generated by, client device 105, server 135, and/or repository 175. Data relating to a self-evolving knowledge graph may include any desired format and arrangement, and may include any quantity of any types of fields of any size to store any desired data. The data relating a self-evolving knowledge graph may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., document text data, vector space model data, entity data, entity association data, confidence score data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of updating a knowledge graph.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., server software, communications software, query module 115, document fetching module 145, model generation module 150, evidence identification module 155, knowledge graph module 160, etc.). These systems may include any types of monitors and input devices (e.g., keyboard, mouse, voice recognition, etc.) to enter and/or view information.

It is to be understood that the software (e.g., server software, communications software, query module 115, document fetching module 145, model generation module 150, evidence identification module 155, knowledge graph module 160, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., server software, communications software, query module 115, document fetching module 145, model generation module 150, evidence identification module 155, knowledge graph module 160, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to a self-evolving knowledge graph). The database system may be implemented by any number of any conventional or other databases, data stores or storage structures (e.g., files, databases, data structures, data or other repositories, etc.) to store information (e.g., data relating to a self-evolving knowledge graph). The database system may be included within or coupled to the server and/or client systems. The database systems and/or storage structures may be remote from or local to the computer or other processing systems, and may store any desired data (e.g., data relating to a self-evolving knowledge graph).

The present invention embodiments may employ any number of any type of user interface (e.g., Graphical User Interface (GUI), command-line, prompt, etc.) for obtaining or providing information (e.g., data relating to a self-evolving knowledge graph), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of updating a knowledge graph, comprising:
receiving a model corresponding to a set of documents, wherein the model comprises a plurality of entities, a plurality of entity associations, and a plurality of confidence scores corresponding to the plurality of entity associations, wherein a confidence score for two entities of an entity association is calculated by dividing a number of documents of the set of the documents in which each of the two entities is present by a total number of documents of the set of documents;
calculating a relevance value for each entity of the plurality of entities that are present in the set of documents and for each entity of the plurality of entities that are present in a new document;
identifying one or more entity associations that are supported by specific portions of the new document, wherein identifying the one or more entity associations that are supported by the new document comprises:
calculating a plurality of cosine similarity values, wherein each cosine similarity value is calculated between a vector comprising the relevance values of the new document and a vector comprising of the relevance values of a document of the set of documents, and
determining that the plurality of cosine similarity values exceed a threshold value for a majority of the comparisons; and
updating the confidence scores for each of the identified one or more entity associations based on a level of support in the new document.

2. The computer-implemented method of claim 1, wherein the relevance value for each entity is calculated according to a term frequency-inverse document frequency.

3. The computer-implemented method of claim 1, wherein the plurality of entities are present in an abstract of a document.

4. The computer-implemented method of claim 1, wherein the set of documents and the new document are processed by applying text normalization using one or more of syntactic cues and semantic cues.

5. The computer-implemented method of claim 1, wherein the new document is selected from a second set of documents, and further comprising: fetching the second set of documents from one or more repositories according to a predefined schedule.

6. A computer system for updating a knowledge graph, the computer system comprising:
one or more computer processors;
one or more computer readable storage media;
program instructions stored on the one or more computer readable storage media for execution by at least one of the one or more computer processors, the program instructions comprising instructions to:
receive a model corresponding to a set of documents, wherein the model comprises a plurality of entities, a plurality of entity associations, and a plurality of confidence scores corresponding to the plurality of entity associations, wherein a confidence score for two entities of an entity association is calculated by dividing a number of documents of the set of the documents in which each of the two entities is present by a total number of documents of the set of documents;
calculate a relevance value for each entity of the plurality of entities that are present in the set of documents and for each entity of the plurality of entities that are present in a new document;
identify one or more entity associations that are supported by specific portions of the new document, wherein identifying the one or more entity associations that are supported by the new document comprises:
calculating a plurality of cosine similarity values, wherein each cosine similarity value is calculated between a vector comprising the relevance values of the new document and a vector comprising the relevance values of a document of the set of documents, and
determining that the plurality of cosine similarity values exceed a threshold value for a majority of the comparisons; and
update the confidence scores for each of the identified one or more entity associations based on a level of support in the new document.

7. The computer system of claim 6, wherein the relevance value for each entity is calculated according to a term frequency-inverse document frequency.

8. The computer system of claim 6, wherein the plurality of entities are present in an abstract of a document.

9. The computer system of claim 6, wherein the set of documents and the new document are processed by applying text normalization using one or more of syntactic cues and semantic cues.

10. The computer system of claim 6, wherein the new document is selected from a second set of documents, and further comprising instructions to: fetch the second set of documents from one or more repositories according to a predefined schedule.

11. A computer program product for updating a knowledge graph, the computer program product comprising one or more computer readable storage media collectively having program instructions embodied therewith, the program instructions executable by a computer to cause the computer to:
receive a model corresponding to a set of documents, wherein the model comprises a plurality of entities, a plurality of entity associations, and a plurality of confidence scores corresponding to the plurality of entity associations, wherein a confidence score for two entities of an entity association is calculated by dividing a number of documents of the set of the documents in which each of the two entities is present by a total number of documents of the set of documents;
calculate a relevance value for each entity of the plurality of entities that are present in the set of documents and for each entity of the plurality of entities that are present in a new document;
identify one or more entity associations that are supported by specific portions of the new document, wherein identifying the one or more entity associations that are supported by the new document comprises:
calculating a plurality of cosine similarity values, wherein each cosine similarity value is calculated between a vector comprising the relevance values of the new document and a vector comprising the relevance values of a document of the set of documents, and determining that the plurality of cosine similarity values exceed a threshold value for a majority of the comparisons; and update the confidence scores for each of the identified one or more entity associations based on a level of support in the new document.

12. The computer program product of claim 11, wherein the relevance value for each entity is calculated according to a term frequency-inverse document frequency.

13. The computer program product of claim 11, wherein the plurality of entities are present in an abstract of a document.

14. The computer program product of claim 11, wherein the set of documents and the new document are processed by applying text normalization using one or more of syntactic cues and semantic cues.

15. The computer program product of claim 11, wherein the new document is selected from a second set of documents, and further comprising program instructions to further cause the computer to: fetch the second set of documents from one or more repositories according to a predefined schedule.

* * * * *